Dec. 20, 1966  W. HEIER  3,292,526
BREWING APPARATUS

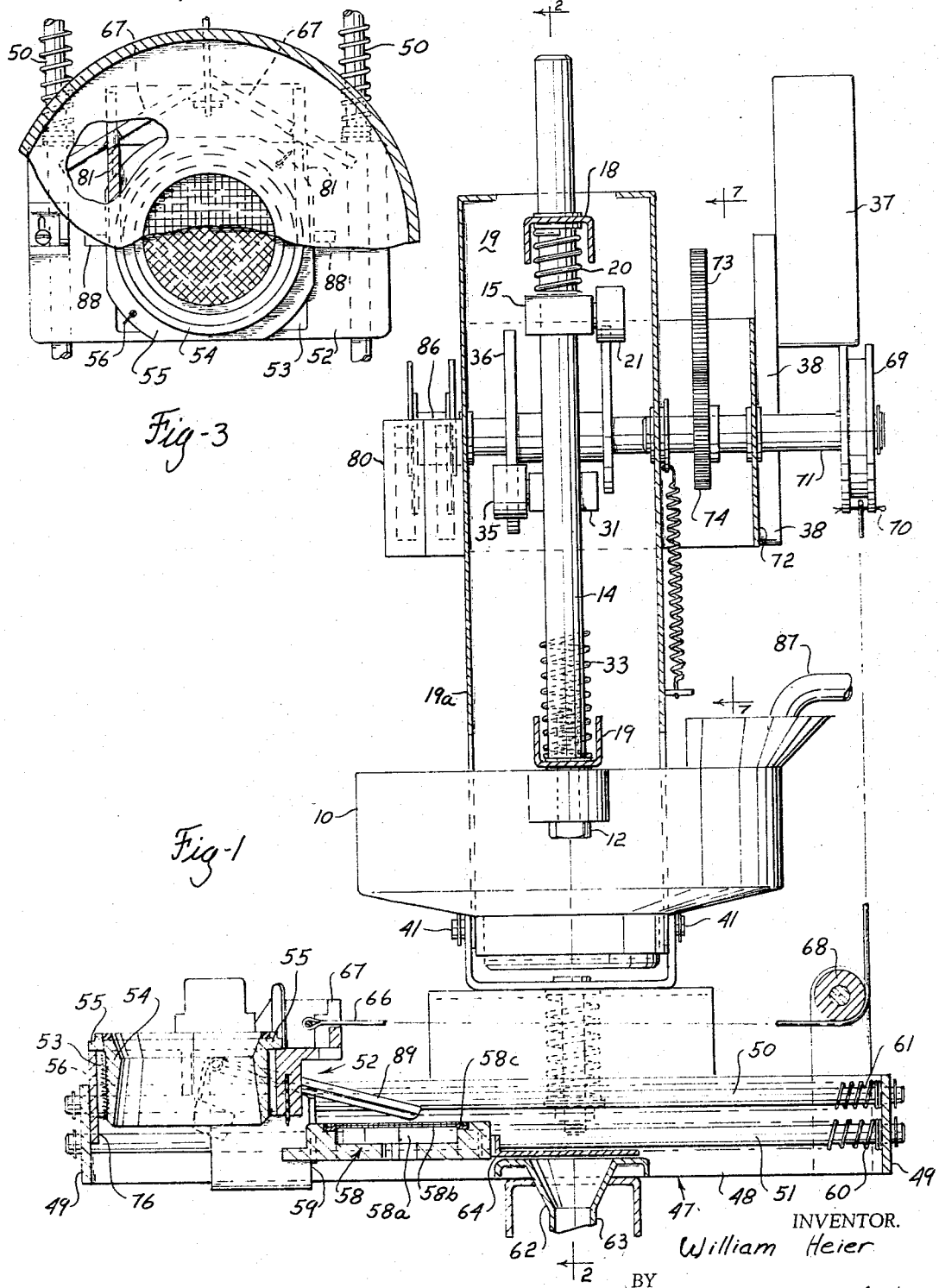

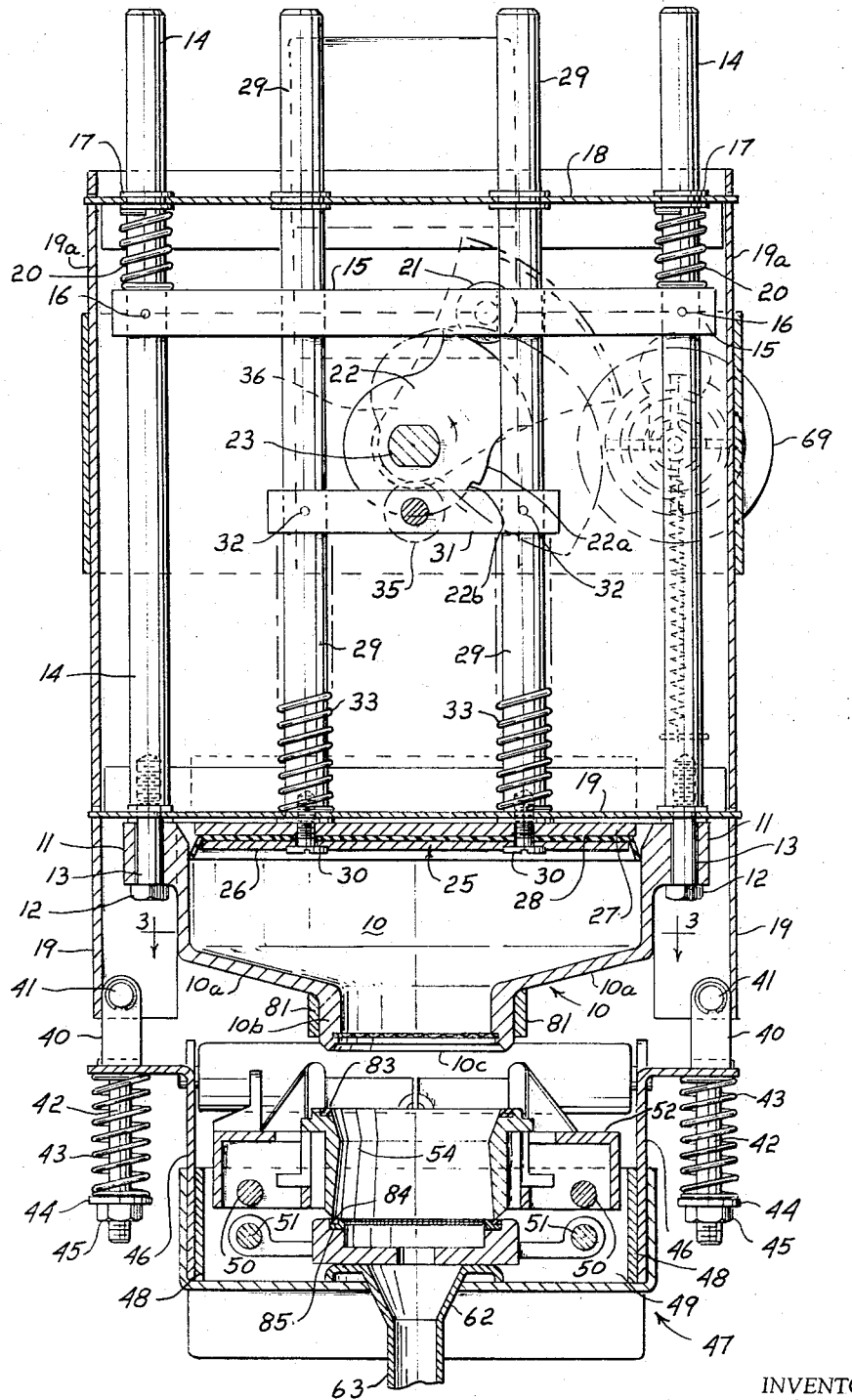

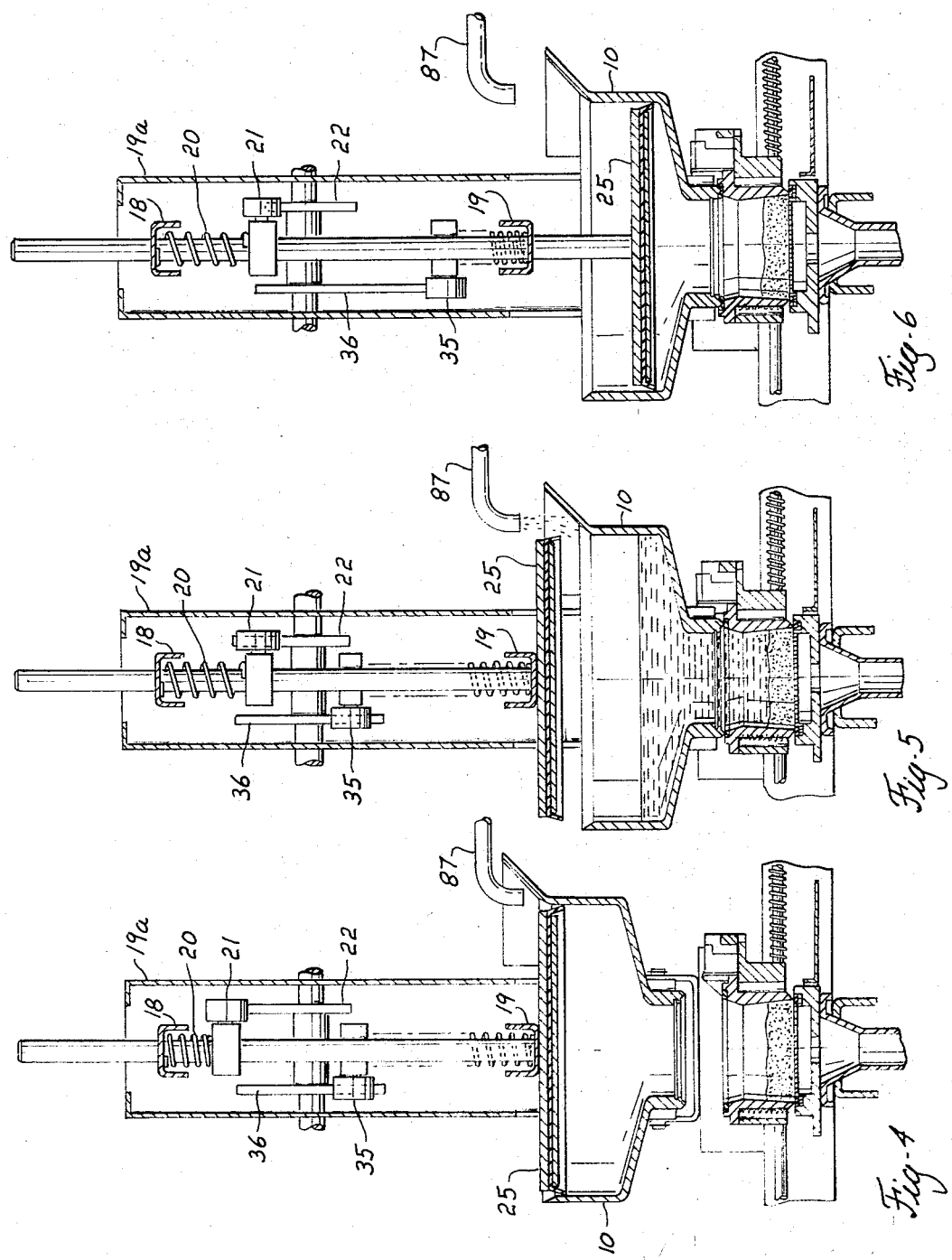

Filed Oct. 15, 1965  4 Sheets-Sheet 4

INVENTOR.
William Heier
BY
Synnestvedt + Lechner
ATTORNEYS

# United States Patent Office 3,292,526
Patented Dec. 20, 1966

3,292,526
BREWING APPARATUS
William Heier, Warminster, Pa., assignor to Rudd-Melikian, Inc., Warminster, Pa., a corporation of Pennsylvania
Filed Oct. 15, 1965, Ser. No. 496,545
7 Claims. (Cl. 99—289)

The application is a continuation-in-part of my copending applications Serial No. 284,638, filed May 31, 1963, and now Patent No. 3,213,777 and Serial No. 404,113, filed October 15, 1964.

This invention relates to apparatus for brewing hot liquid beverages by the extraction technique. While not limited thereto, the apparatus of the invention is especially useful in the preparation of hot coffee from a freshly ground charge of coffee.

Brewers of the type illustrated herein are especially suitable for use in coin operated vending machines, since they are capable of dispensing cup-sized quantities of fresh, good tasting coffee, on demand.

The invention is particularly concerned with a novel arrangement of certain portions of structure of the type disclosed in each of said copending applications, and more particularly in improvements in the brewing cylinder and piston disclosed in said applications.

While the cylinder and piston of the invention are well suited for brewing a beverage from charges of a beverage material encapsulated in a water permeable paper and mounted on a carrier tape, they are also epsecially adapted for brewing coffee from a charge of coffee which is not encapsulated, as for example, when used in association with the reciprocally mounted beverage holder disclosed in the aforesaid copending application Serial No. 404,113. In order to afford a clear understanding of the operation of the invention the brewing cylinder apparatus is discussed in association with the apparatus discussed in that application.

With the foregoing in view, a primary object of the present invention is the provision of apparatus capable of rapidly brewing, on demand, hot beverages from a beverage forming material.

Another object of the invention is the provision of an improved and simplified arrangement for effecting a pressure seal between the various parts of the brewing apparatus.

A more specific object of the invention is the provision of an arrangement for improving the operating efficiency of a piston operated brewer.

A still further object of the invention is the provision of brewing apparatus which possesses the qualities of reliability and dependability essential in equipment used in the vending machine industry.

In brief, the foregoing and other objects of the invention are achieved by means of a brewing cylinder which is adapted to be moved axially into engagement with a cavity in a beverage material holder. After the cylinder is moved into engagement with the edges of the cavity, brewing liquid, normally hot water, is added to the cylinder. A piston is moveable from a position outside of the cylinder into the cylinder to form the top of a pressurized chamber. As the piston moves into the chamber and is progressively advanced towards the other end, it forces the water, followed by a cushion of air through the charge of coffee and out of a drain in the bottom of the cavity. The cylinder is characterized in having an extremely large bore in relation to the stroke of the piston. In addition, the end wall of the cylinder which surrounds the end wall opening through which the brewing liquid is forced, is substantially larger than the end wall opening. The arrangement provides for increased brewing pressures for a given sized prime mover, making possible the use of less expensive motors to produce the desired brewing pressure. The piston exerts a pressure on the cylinder end wall as it advances through the cylinder, effecting a water tight seal between the opening in the cylinder end wall and the cavity in the beverage material holder, and also between various parts of the beverage material holder itself.

The foregoing will be clearly understood upon consideration of the following detailed description of the illustrative embodiment of the invention and from the accompanying drawings in which:

FIGURE 1 is an elevational view of brewing apparatus constructed according to the principles of the present invention;

FIGURE 2 is a sectional view taken along the lines 2—2 of FIGURE 1;

FIGURE 3 is a sectional view taken along the lines 3—3 of FIGURE 2, with the portions of the structure broken away for purposes of illustration;

FIGURES 4, 5 and 6 are sectional elevational views, somewhat similar to FIGURE 2, schematically illustrating successive stages of a brewing cycle;

Figure 7:
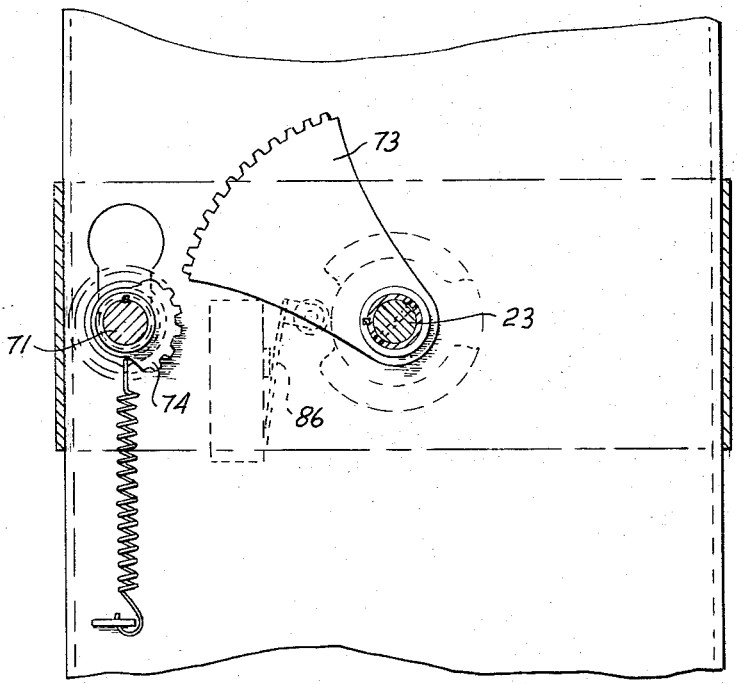
FIGURE 7 is a detailed view of a portion of a structure shown in FIGURES 1 and 2.

As viewed in FIGURES 1 and 2, the illustrative embodiment of the invention comprises a hollow cylinder 10. The cylinder 10 is provided with an end wall 10a and a downwardly extending portion 10b terminating in an end wall opening 10c. A pair of spaced apart lugs 11 are located on opposite sides of the cylinder. Bolts 12 pass through holes 13 provided in each lug. The bolts are threaded into a pair of vertically extending guide rods 14. Rods 14 are secured together by a beam 15 by means of pins 16. The rods 14 are mounted for vertical movement in guides 17 mounted in an upper channel 18 and in a lower channel 19. Each of the channels is supported in side walls 19a of the frame of the apparatus. A coil spring 20 is mounted on each of the guide rods 14 between the beam 15 and the web of channel member 18. The springs urge the beam, the guide rods 14 and the cylinder 10 downwardly. A roller 21 is mounted on one side of the beam 15. The roller rides on the surface of a cam 22 secured to a shaft 23 for rotation therewith. The cam, whose operation will be described in detail hereinafter, controls the vertical position of the cylinder 10.

A piston 25 is mounted for vertical movement into and through cylinder 10. The piston is made up of a pair of plates 26 and 27, between which is sandwiched a gasket 28. The plates and gasket are secured to each other and to a pair of vertically extending guide rods 29 by means of machine bolts 30. The arrangement is such that the gasket can be easily removed and replaced merely by removing the machine bolts 30.

Guide rods 29 are mounted for vertical movement in apertures in the channel members 18 and 19. The guide rods are connected by a beam 31 which is secured to the rods by pins or rivets 32. Coil springs 33 are mounted on the guide rods 29, between the beam 31 and the web of the channel 19. The base of each spring is supported by the channel web and the springs react on the lower surface of beam 31 to urge the beam, the rods 29 and the piston 25 upwardly to a position just underneath the channel 19 as is viewed in FIGURE 1.

Beam 31 carries a roller 35, which rides on the surface of a cam 36. The cam is mounted on the shaft 23 for rotation therewith. It will be evident that rotation of the cam controls the vertical position of the roller 35 and the piston 25.

Shaft 23 is driven by a motor 37, through suitable reduction gearing housed in a casing 38. The gear reduction is such that the shaft 23 and hence the cams 22 and"

36 rotate one complete revolution during each brewing cycle.

Although as mentioned above, the brewer may be used in conjunction with coffee tape of the type discussed in my copending application Serial No. 284,638, it is especially suitable for use in conjunction with the eqiupment for brewing coffee from a loose ground charge of coffee as disclosed in my copending application Serial No. 404,113. A brief description of that apparatus will follow to provide a basis for a complete understanding of the present invention.

As viewed in FIGURES 1 and 2, a pair of U-shaped brackets 40 are secured to the frame members 19a by means of pins 41. Each bracket supports a carriage bolt 42, as may be seen in FIGURE 2. A coil spring 43 is supported on the shank of each bolt 42 by means of flat washers 44, positioned by nuts 45 threaded on the ends of the bolts. The springs exert pressure against angularly shaped carriage support brackets 46 which in turn support a rectangular frame 47 having side walls 48 and end walls 49.

Spaced apart pairs of rods or guide rails 50 and 51 are mounted in the ends walls 49. A carriage 52 rides on the guide rails 50. The carriage, viewed in plan in FIGURE 3, is generally rectangular in shape and is provided with an opening 53 which supports a sleeve-like insert 54. The insert 54 has a flange 55 which normally rests on the top surface of the carriage 52. The insert is held in place by springs 56 connected to the flange and to suitable lugs at the base of the carriage. The springs bias the insert downwardly into the position in which it sits firmly on the carriage.

A subcarriage 58 is slideably mounted on the rails 51. Subcarriage 58 has an opening 58a substantially the same size as the opening in the insert 54. The opening is covered by a porous filter 58b and is preferably surrounded by a soft rubber gasket 58c. Subcarriage 58 is urged to the left hand position shown in FIGURE 1 against a stop 59, by means of coil springs 60 mounted on the rails 51. Springs 61 mounted on the rails 50 urge the carriage 52 into engagement with end wall 49, as viewed in FIGURE 1.

A drain structure 62, shown in FIGURES 1 and 2, is also mounted on the rectangular frame 47 in axial alignment with the opening in the cylinder 10. The drain is provided with a suitable outlet spout 63, which leads to a dispensing station, not shown, at which a cup is placed prior to the brewing cycle. A cover plate 64 is mounted on guide rails 51 and normally rests over the opening of the drain 62 to protect it from being contaminated with dirt or spent coffee grounds. The cover is urged against the side of the subcarriage 58 by means of the springs 60.

The carriage 52 is adapted to be moved to a position underneath the cylinder 10 by drive means, including a cable 66 which is attached to an upright member 67 integral with the carriage. The cable is guided around a roller 68 and extends upwardly to where it is connected to a pulley 69 by means of a pin 70. Pulley 69 is secured to a shaft 71 mounted for rotation in the frame and in a bracket 72.

As viewed in FIGURE 7, a gear segment 73 is mounted on the shaft 23 for rotation by the motor 37. At a predetermined point in the brewing cycle, the segment teeth engage the teeth of a pinion 74 mounted on the shaft 70. Rotation of the pinion by the segment 73 rotates the pulley 69 to wind up cable 66. The cable pulls the carriage 52 towards the right as viewed in FIGURE 1, against the urging of the springs 61. During the movement to the right hand position, a stop 76, extending downwardly from the carriage 52, engages the rear of the subcarriage 58 and thereafter the carriage and the subcarriage move as a unit to a position underneath the cylinder 10, with the subcarriage in alignment with the sleeve 54 in the carriage 52. After carriage and subcarriage are in registry, a dispensing mechanism dispenses a charge of coffee into the cavity or receptacle formed by the sleeve 54 and the subcarriage 58.

Reference will now be made to FIGURES 4 through 6 for an explanation of the operation of the various portions of the apparatus so far described. At the beginning of a brewing cycle, cylinder 10 and piston 25 are in the positions shown in FIGURE 4. It should be noted that both piston 25 and cylinder 10 are in their extreme upper position. When a coin is deposited, motor 37 is energized and begins to rotate shaft 23. Gear segment 73 engages pinion 74 and draws carriage 52 towards the right as viewed in FIGURE 1. When the carriage and the subcarriage are in registry, an abutment mounted on the carriage, closes and operates the dispensing apparatus, causing it to dispense a charge of ground coffee into the cavity formed by the sleeve 54 and the subcarriage 58. The carriage continues its movement until it is underneath the cylinder 10. At this time cam 22 has rotated in a counterclockwise direction, as viewed in FIGURE 2, until it reaches the position in which the roller 21 moves downwardly onto the surface 22a of the cam. In this position, the brewing cylinder moves downwardly through the urging of the springs 20 into the position shown in FIGURE 5. At this point in the operating cycle, segment 73 has moved out of engagement with the pinion 74 and the carriage is free to return to its retracted position through the action of springs 60 and 61. Segment 73 releases pinion 74 shortly after follower 21 has moved down onto the surface 22a of the cam 22. In this condition of the parts, the abutment 67, which is formed in the shape of a shallow V as viewed in FIGURE 3, engages a pair of abutments 81 secured to the cylinder, causing the cup-shaped cavity in the carriage to be centered directly under the opening 10c in the cylinder end wall.

Shaft 23 has now rotated to the point where follower 21 moves further downwardly onto the surface 22b of the cam and this allows the cylinder to move into engagement with a rubber sealing ring 83 at the top of the insert 54. The springs 20 exert enough force to effect a water tight seal between the cylinder and the ring 83, and also between a rim 84 at the bottom of the sleeve 54 and the sealing ring 58c in the subcarriage 58.

In this position, as shown in FIGURE 5, the piston is outside of the cylinder and at this time a switch 86, shown in FIGURE 1, closes, operating suitable electric circuitry to cause a volume of water to be delivered to the cylinder through a dispensing line 87 (see FIGURE 5). Thereafter, cam 36 (FIGURE 2) forces follower 35 downwardly, and piston 25 begins its downward stroke, continuing until it reaches the position shown in FIGURE 6.

It should be noted that as the piston moves into the cylinder, a pocket of air is formed between the piston and the brewing liquid. This air cushion is extremely desirable because as the piston travels downwardly, forcing the water and much of the air through the coffee grounds in the cup-shaped container the air forces most of the water out of the coffee grounds improving the flavor of the coffee brew and drying the grounds somewhat thus reducing some of the messiness involved in disposing of them.

As soon as the piston is in pressure engagement with the cylinder side walls the pressure exerted on the cylinder end wall forces the edges of the cylinder opening and the various cup parts into extremely tight sealing relationship. At this point, the spring mounting of the carriage or holder provides for some yieldability, contributing to the seal, especially if for some reason the parts are initially slightly out of alignment.

After the coffee is dispensed, piston and cylinder are returned to the position shown in FIGURE 4. At that point, since, as noted above, the gear segment 73 is out of engagement with pinion 74, the carriage 52 and subcarriage 58 are freed for return to the left hand position shown in FIGURE 1. Subcarriage 58 is stopped by the stop 59, whereas main carriage 52 returns to the extreme left hand position. During the return of the carriage, a pair of lugs 88, integral with the sides of the insert 54 (see FIGURE 3), engage the surface of a pair of ramps 89 shown in FIGURE 1. As the carriage travels to the left the abutments lift the insert against the urging of the springs 56. When the abutment reach the left hand end of the ramps 89 the springs 56 pull the insert down sharply shaking out the spent coffee grounds.

One particularly important feature of the invention should be noted at this point. Due to the relatively large bore of the cylinder, as compared with the stroke of the piston 25, a relatively high pressure is developed within the piston, with a very low horsepower motor. Since this pressure is exerted against the cylinder end wall which has a large area when compared to the end wall opening, the edges of the opening are forced tightly into engagement with the cup portions as soon as the piston effects the pressure seal within the cylinder. In addition, the larger diameter makes it possible to develop a much larger air cushion within the cylinder than is practically possible by merely increasing the stroke of the piston.

As an example, it has been found that extremely effective results are achieved with a cylinder having an inside diameter of about 5.25 inches, an outlet diameter of about 1.875 inches, and a pumping stroke of 1.25 inches. The cylinder shown in the drawings is thus formed and has a total volume of 26 cubic inches. When brewing cup-sized quantities of coffee, which require 11 cubic inches of water, it may be seen that an air cushion of about 15 cubic inches is available. Using this cylinder and driving the piston with a motor developing a torque of 60 inch-pound, brewing pressures of 8 to 40 p.s.i. are developed. More than adequate sealing force is available to prevent water leakage even at maximum brewing pressures.

Figure 8:
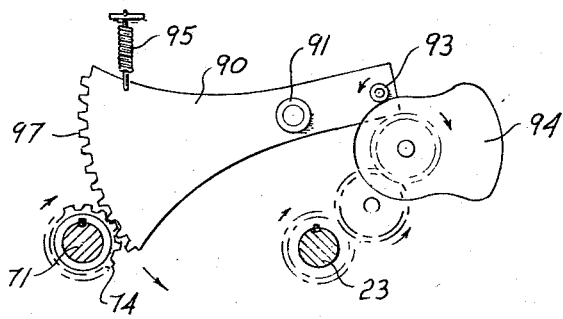
FIGURE 8 is a modified form of the structure shown in FIGURE 7.

Attention is now directed to FIGURE 8 which shows a modified form of drive for the carriage 52. As shown therein, the pinion 74 is secured to the shaft 71. A gear segment 90, pivotally mounted on a stub shaft 91, is provided with teeth 97 which mesh with the teeth of the pinion 74. A follower pin 93 is mounted on the opposite end of the segment 90, in position to engage the surface of a cam 94. A spring 95 urges the pin in a clockwise direction into engagement with the control surface of the cam. As the motor rotates shaft 23, cam 94 first rocks the gear segment in one direction to rotate the pinion 74 and to draw the carriage underneath the cylinder, by means of the pulley 69 and the cable 66. After the beverage has been brewed, the segment rocks in the opposite direction, allowing the carriage to be returned to its retracted position.

From the foregoing it may be seen that the present invention provides a highly effective and reliable means for rapidly brewing freshly ground coffee or similar beverage. The brewer is extremely efficient and simple in construction, requiring far less power than has heretofore been required in piston operated brewers.

I claim:

1. A brewer for sequentially brewing beverage portions by passing a brewing liquid through a series of charges of particulate beverage material, comprising a beverage material holder having a beverage material cavity, a brewing liquid cylinder moveably mounted above said holder for motion toward and away from said beverage material holder, said cylinder having an opening in the end wall thereof which is adjacent said cavity, said holder and cylinder having opposed annular surfaces for forming a seal around the periphery of said cavity and said opening respectively, which annular surfaces are brought into liquid sealing interengagement when said cylinder is moved toward the holder, a piston fitting within said cylinder and mounted for reciprocation from a retracted position to a position adjacent said end wall opening, means for moving said cylinder toward the holder to bring said annular surfaces into interengagement, and means for thereafter driving said piston within the cylinder and toward said opening to progressively force said brewing liquid under pressure through the beverage material in said cavity, said piston having a pressure area appreciably greater than the cross sectional area of the space lying within the seal, the differences in said areas being sufficiently great so that the force applied by said piston to the seal provides that said seal is a liquid-tight seal around said cavity and maintains said seal throughout the movement of said piston within the cylinder and toward said opening.

2. Apparatus according to claim 1 wherein the area of said end wall is at least twice the area of the opening therein.

3. Apparatus according to claim 1 wherein the area of the end wall is at least 2.6 times the area of the end wall opening.

4. Apparatus according to claim 1 further including means to move said beverage material holder from a position spaced from said cylinder and a retracted position in which said cavity is in alignment with the cylinder end wall opening.

5. A brewer according to claim 4, further including guide means for supporting said holder, yieldable means for urging said holder away from said position in which said cavity and said end wall opening are in alignment, said means for moving said holder including a flexible drive element connected at one end to said holder, means including a rotatably mounted take-up pulley connected to the other end of said flexible element for drawing said holder into said position of alignment, drive means for said pulley including a pinion mounted for conjoint rotation with said pulley, a gear segment meshing with said pinion, means including a cam for oscillating said gear segment thereby causing said flexible element to first move said holder from said retracted position into said position of alignment and for thereafter returning said holder to said retracted position.

6. A brewer according to claim 1, wherein said means for moving said cylinder includes means for yieldingly urging said cylinder into the position in which said annular surfaces are interengaged, retaining mechanism for releasably holding said cylinder in the retracted position and a control means for operating said retaining mechanism to cause said retaining mechanism to release said cylinder for movement into the position in which said annular surfaces are in interengagement.

7. A brewer according to claim 6, further including at least two guide rods connected to said cylinder for guiding said cylinder along a path extending toward and away from the beverage material holder, said yieldingly urging means including a coil spring mounted on each of said rods, said springs being arranged to urge said cylinder towards the sealing position in which the annular surfaces are in interengagement, a cam, a motor for driving said cam through an operating cycle, a cam follower mounted on said guide rods, said springs urging said follower into engagement with said cam, said cam being shaped to release said cylinder for movement to the sealing position during an initial portion of said operating cycle and for thereafter moving said cylinder away from said holder at a time later in said operating cycle.

References Cited by the Examiner
UNITED STATES PATENTS

| | | | |
|---|---|---|---|
| 1,390,008 | 9/1921 | Arduino | 99—289 X |
| 1,754,146 | 4/1930 | Colvino | 99—302 |
| 2,529,395 | 11/1950 | Hummel | 99—302 |
| 2,907,266 | 10/1959 | Moulden | 99—289 |
| 3,019,719 | 2/1962 | Parraga | 99—302 |
| 3,203,340 | 8/1965 | Totten | 99—289 |

WALTER A. SCHEEL, *Primary Examiner.*

S. P. FISHER, *Assistant Examiner.*